United States Patent
Okamura

[11] Patent Number: 5,969,505
[45] Date of Patent: Oct. 19, 1999

[54] CHARGING SYSTEM FOR CHARGING CAPACITORS OF A CAPACITOR BANK

[75] Inventor: Michio Okamura, Kanagawa, Japan

[73] Assignee: JEOL Ltd., Tokyo, Japan

[21] Appl. No.: 08/985,471

[22] Filed: Dec. 5, 1997

[30] Foreign Application Priority Data

Dec. 5, 1996 [JP] Japan .................................. 8-325043
Dec. 6, 1996 [JP] Japan .................................. 8-326351

[51] Int. Cl.[6] .................................................. H01M 10/46
[52] U.S. Cl. .................................. 320/122; 320/166
[58] Field of Search .................................. 320/116, 118, 320/120, 122, 125, 132, 136, 160, 166, FOR 105, FOR 114, FOR 117, FOR 122

[56] References Cited

U.S. PATENT DOCUMENTS

| | | | |
|---|---|---|---|
| 4,061,955 | 12/1977 | Thomas et al. .......................... | 320/122 |
| 4,238,721 | 12/1980 | DeLuca et al. .......................... | 320/122 |
| 5,578,914 | 11/1996 | Morita ..................................... | 320/122 |
| 5,675,233 | 10/1997 | Kaneko et al. .......................... | 320/122 |
| 5,677,613 | 10/1997 | Perelle ..................................... | 320/122 |

OTHER PUBLICATIONS

Denshi Gijyutsu, 1994, 12, pp. 1–3 (Electronic Engineering, vol. 36, No. 12, 1994).
"A Basic Study on Power Storage Capacitor Systems", Michio Okamura, Denki Gakkai Ronbunshi, vol. 155–B, No. 5, May 1995, pp. 504–510.

*Primary Examiner*—Edward H. Tso
*Attorney, Agent, or Firm*—Webb Ziesenheim Logsdon Orkin & Hanson, P.C.

[57] ABSTRACT

There is disclosed an apparatus for efficiently charging a capacitor bank consisting of capacitors connected in series. The apparatus needs parallel monitors of a small maximum rating though the capacitors are charged quickly with a large charging current from a charger. The monitors bypass the charging current at voltages exceeding a preset voltage. The state of charge of the bank is detected. If certain conditions are satisfied (e.g., the terminal voltage of the bank exceeds a preset value, at least one of the monitors is turned on, or the terminal voltage of at least one of the capacitors exceeds a preset value), a charging control circuit reduces the charging current. This current is gradually reduced. Immediately before the bank is fully charged, the charging current is reduced greatly or in a stepwise fashion.

6 Claims, 3 Drawing Sheets

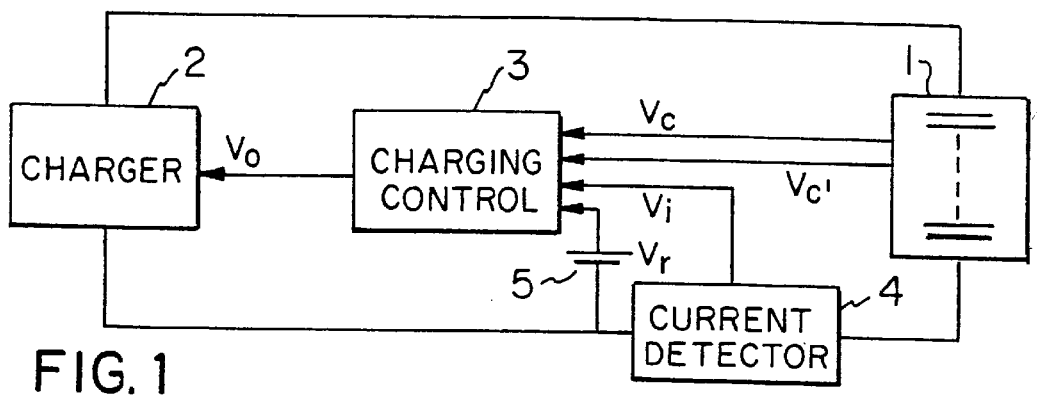
FIG. 1
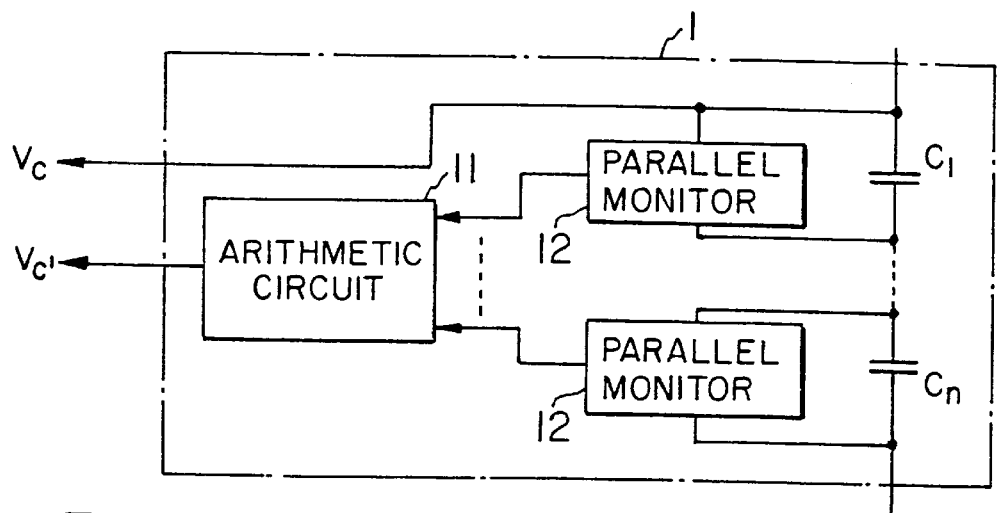
FIG. 2
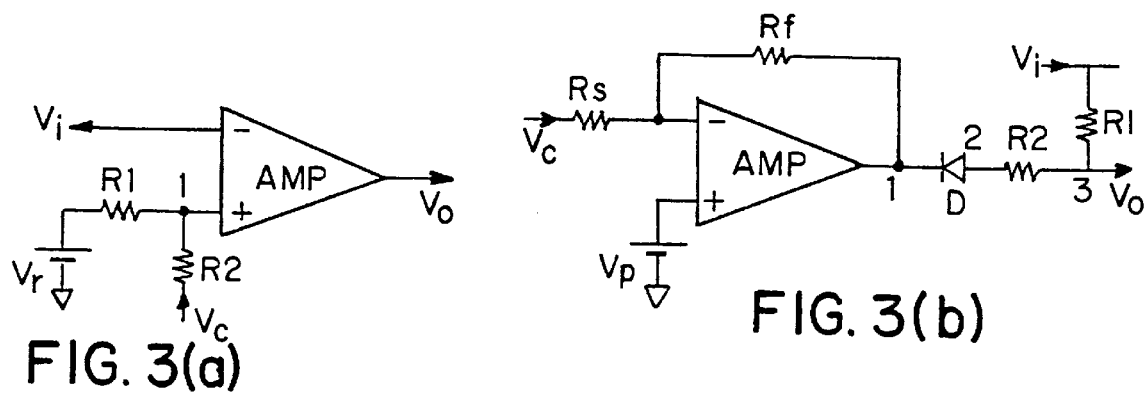
FIG. 3(a)
FIG. 3(b)
FIG. 3(c)

CHARGING SYSTEM FOR CHARGING CAPACITORS OF A CAPACITOR BANK

FIELD OF THE INVENTION

The present invention relates to an apparatus for controllably charging a bank of capacitors connected in series and having parallel monitors.

DESCRIPTION OF THE PRIOR ART

ECSes (energy capacitor systems) have been introduced in various literature (e.g., Denshi Gijyutsu, 1994, 12, pp. 1–3; Denki Gakkai Ronbunshi, Vol. 115, No. 5, 1995, pp. 504–610) as a power storage system consisting of capacitors, parallel monitors and current pumps. These capacitors are connected in series to form a capacitor bank. The parallel monitors are connected across their respective capacitors of the bank. When the capacitors are charged to more than a value set for the parallel monitors, these monitors bypass the charging current around the capacitors.

In the capacitor bank equipped with the aforementioned parallel monitors, these monitors bypass the charging current around the capacitors so that the terminal voltages of the capacitors will not exceed the set value during charging. Therefore, all the capacitors in the bank are charged uniformly up to the set voltage. Consequently, it is possible to utilize almost fully the capability of the capacitors to store electric power.

During discharge, the terminal voltages of the capacitors monotonously drop from a level obtained in a fully charged state. Therefore, the parallel monitors are turned off and do not participate at all in the operation during discharge. That is, essentially, electrical current flows through the parallel monitors only during charge of the capacitors. Accordingly, the parallel monitors consume electrical power only when the capacitors are charged past the rated voltage. This low loss is the feature of the parallel monitors.

As energy capacitor systems find more extensive application, very quick charging and discharging have been required. In this case, it is necessary to increase the charging current. The parallel monitors bypass a maximum amount of current when the charging is complete. The bypassed current is nothing other than the charging current. As long as the parallel monitors are operating normally, the terminal voltages of the capacitors are prevented from surpassing the set voltage. Therefore, the maximum power that the parallel monitors must bear is the product of the set voltage and the maximum charging current.

Let us assume that each capacitor has a rated voltage of 3 V and that each parallel monitor is correspondingly set to 3 V. We also assume that the charging current is a constant current of 10 A. The maximum amount of heat generated by each parallel monitor (i.e., under 100%-bypassed condition) is 30 W. As a further example, it is assumed that capacitors are charged with large currents produced transiently as encountered in regenerative braking of an electric vehicle. If the charging current is 100 A, each parallel monitor produces heat of 300 W.

In this way, as the charging current is increased, the rated power of the parallel monitor needs to be increased. Temperature rise of the heat-dissipating device of the parallel monitor caused by transient heating can be limited to within a tolerable range if the heating period is short. However, the maximum current handled by the electronic circuit and the rated electric power must be set correspondingly. In the ECS, charging is normally done in a time shorter than 15 minutes, e.g., 30 seconds, with a large electrical current. In this case, the rated power of the parallel monitor is inevitably set to an exorbitantly large value.

If parallel monitors are omitted for the above-described reason, capacitors cannot exhibit their capability to store electrical power to the full due to nonuniform charging. In addition, where voltage-averaging resistors are connected in parallel with the capacitors, various problems such as power loss and self-discharge, which the parallel monitors should have solved, recur unavoidably.

SUMMARY OF THE INVENTION

The present invention is intended to solve the foregoing problems. It is an object of the present invention to provide an apparatus that is used to charge capacitors with a large current but can be constructed using parallel monitors having a small rated power.

This object is achieved in accordance with the teachings of the invention by a capacitor-charging apparatus for having parallel monitors across each capacitor for bypassing a charging current at voltages exceeding a preset voltage (a bank of capacitors connected in series). This apparatus detects the state of charge of the capacitor bank. When the detected state satisfies certain conditions, the apparatus reduces the charging current. For example, the conditions under which current is reduced comprise the terminal voltage of the bank has exceeded a preset value, at least one of the parallel monitors for bypassing current is turned on, and/or the terminal voltage of at least one of the capacitors has exceeded a preset value.

BRIEF DESCRIPTION OF THE DRAWINGS

Other objects and features of the invention will appear in the course of the description thereof, which follows:

FIG. 1 is a circuit diagram of a charging control apparatus comprising parallel monitors consuming less amounts of electric power than conventional, the apparatus being built in accordance with the present invention;

FIG. 2 is a circuit diagram of a bank of capacitors equipped with parallel monitors, the bank of capacitors being included in the apparatus shown in FIG. 1;

FIGS. 3(a)–3(c) are circuit diagrams showing examples of a charging control circuit included in the apparatus shown in FIG. 1;

DESCRIPTION OF THE PREFERRED EMBODIMENTS

Figure 4A:
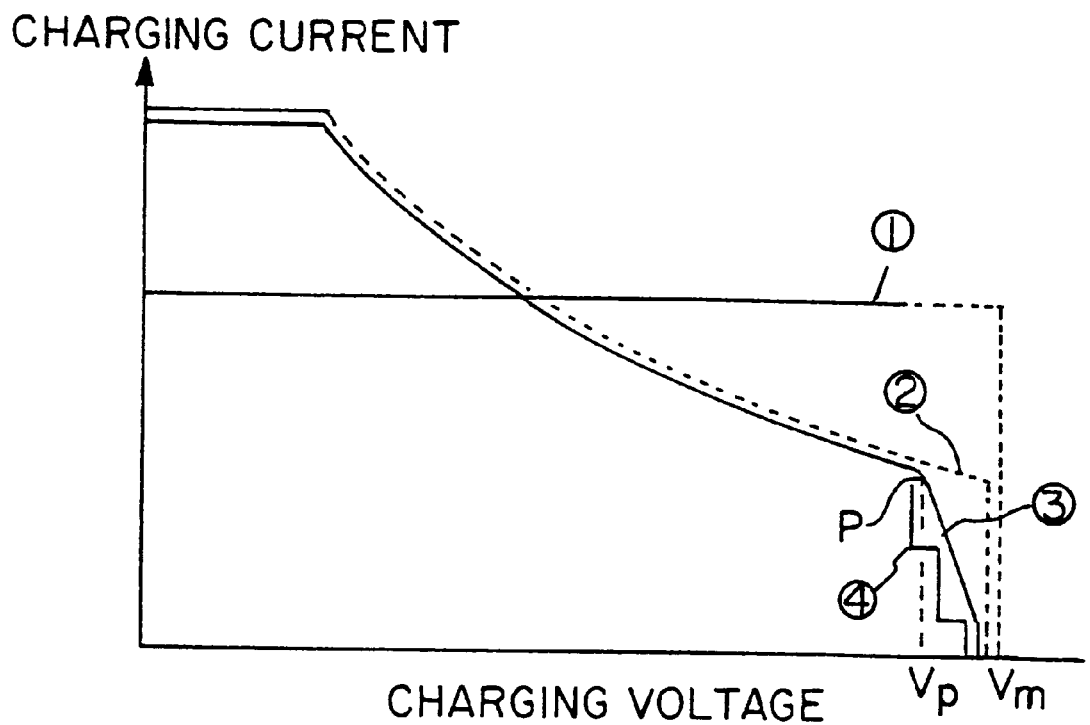
FIGS. 4(a) and 4(b) are diagrams showing examples of the charging current-charging voltage characteristic of a charger.

Referring to FIG. 1, there is shown an apparatus for controllably charging capacitors, the apparatus embodying the concept of the present invention. This apparatus includes a bank of capacitors equipped with parallel monitors. This bank, indicated by numeral 1, is shown in the circuit diagram of FIG. 2. The apparatus further includes a charging control circuit 3. Some examples of this charging control circuit 3 are presented in FIGS. 3(a), 3(b) and 3(c).

Referring first to FIG. 1, the capacitor charging control apparatus includes a charger 2, a current detector 4, and a reference voltage source 5 for generating a reference voltage $V_r$, as well as the bank 1 of capacitors and the charging control circuit 3 described above.

Referring to FIG. 2, the capacitors forming the bank 1 are denoted by $C_1$–$C_n$. Parallel monitors 12 are connected in parallel with the capacitors $C_1$–$C_n$, which in turn are connected in series. The monitors 12 bypass the charging current when the terminal voltages of the capacitors reach a preset value. For example, where the bank is comprised of ten capacitors connected in series and having a maximum rated voltage of 3 volts, the terminal voltage achieved is limited to 30 volts by the charging control circuit 3. The set voltage for the parallel monitors is so determined that they start to bypass the current at a voltage slightly higher than 3 volts (e.g., approximately 3.05 V). Consequently, the capacitors are uniformly charged by the operation of the parallel monitors. Electric power is stored in the capacitors up to their full capacities.

When the state of charge of the bank 1 of capacitors with the parallel monitors is detected, an arithmetic circuit 11 produces an output signal $V_c'$ to the charging control circuit 3. The charging control circuit 3 produces a control signal $V_o$, depending on the output signal $V_c'$ from the arithmetic circuit 11, on the output signal $V_i$ from the current detector 4, and on the preset reference voltage $V_r$. The control signal $V_o$ is sent to the charger 2 to control the charging current supplied to the capacitor bank 1.

The charger 2 produces the charging current according to the control signal $V_o$ from the charging control circuit 3 and supplies the charging current to the capacitor bank 1. This charging operation is stopped when the capacitor bank 1 is charged to a voltage slightly lower than the voltage produced when the bank is fully charged. The current detector 4 detects the charging current supplied from the charger 2 to the capacitor bank 1. The reference voltage $V_r$ provides a basis for determining the control signal $V_o$ in the charging control circuit 3.

The output signal from the whole capacitor bank 1 is detected as shown in FIG. 2. The signal $V_c$ representing the state of charge is produced. The arithmetic circuit 11 performs calculations, using signals indicating the state of the operating parallel monitors 12. The results can be produced as an output signal $V_c'$ from the arithmetic circuit 11. The signals indicative of the operation of the monitors 12 indicate whether the monitors 12 are ON or OFF (whether they are bypassing the charging current or not). Alternatively, voltage comparators may be connected in parallel with the parallel monitors 12. In this case, the aforementioned signals indicating the operation of the monitors 12 indicate whether a given voltage is reached or not. The arithmetic circuit 11 performs logical operations, for example, on these signals and produces the output signal $V_c'$ representing the state of charge.

The charging control circuit 3 includes any one of circuits shown in FIGS. 3(a)–3(c). The circuit shown in FIG. 3(a) acts to gradually reduce the charging current as the terminal voltage rises as indicated by curve ② of FIG. 4(a) described later. This circuit comprises an amplifier AMP for producing a control signal $V_o$ to control the charging current so that a voltage produced at a node 1 is equal to the output signal $V_i$ from the current detector 4. The voltage appearing at the node 1 is the sum of the reference voltage $V_r$ and the output voltage $V_c$ from the capacitor bank. Therefore, if the output voltage $V_c$ from the bank is not added, the control signal $V_o$ controls the charging current from the charger 2 in such a way that the output signal $V_i$ from the current detector equals the reference voltage $V_r$. If the output signal from the capacitor bank is added as the output signal $V_c$, voltage-dividing resistors R1 and R2 decrease the voltage appearing at the node 1 as the capacitor voltages rise. Consequently, the charging current can be gradually reduced as the terminal voltage rises.

By inserting nonlinear elements or circuits in the voltage-dividing resistors R1 and R2, the charging current is made to vary nonlinearly or along successively bent lines as the terminal voltage of the capacitor bank rises.

FIG. 3(b) shows a circuit configuration used to reduce the current at a preset voltage $V_p$ in a stepwise manner as indicated by curve ③ in FIG. 4(a) described later. The output $V_o$ from the circuit of FIG. 3(a) is supplied to an input terminal $V_i$ of FIG. 3(b).

In this configuration, while the terminal voltage $V_c$ of the capacitor bank is lower than the set voltage $V_p$, the voltage appearing at the node 1 is positive. On the other hand, the output signal $V_i$ (the output $V_o$ from the circuit of FIG. 3(a)) is close to ground potential and the voltage at the node 2 is lower. Therefore, a diode D is cut off. $V_i$ is produced as the control signal $V_o$ without being affected. Accordingly, while the terminal voltage $V_c$ of the capacitor bank is lower than the set voltage $V_p$, the charging current gradually decreases as the terminal voltage rises in the same way as the characteristic curve ② of FIG. 4(a).

If the terminal voltage $V_c$ of the capacitor bank exceeds the set voltage $V_p$, the potential at the node 1 is made negative by the amplification of the amplifier consisting of an operational amplifier. Subsequently, as the terminal voltage $V_c$ of the bank increases, the absolute value of the potential increases. This biases the diode D into conduction. The voltage at the node 1 pulls the potential at a node 3 in the negative direction via the resistor R2, thus rapidly decreasing the control voltage $V_o$. Therefore, a characteristic as indicated by curve ③ in FIG. 4(a) can be obtained by appropriately determining constants.

The circuit shown in FIG. 3(c) is used when the current is varied in a stepwise fashion as indicated by curve ④ in FIG. 4(a). The operation is similar to the operation of FIG. 3(b), but a comparator is used instead of the operational amplifier. A transistor TR is driven into conduction at the set point so that the voltage division ratio of the voltage-dividing resistors R1 and R2 can be switched. In the example described thus far, the ratio is switched between two values by an analog method. However, digital control will produce greater advantages and facilitate switching the ratio between numerous values.

In the present invention, the state of charge of capacitors is detected as mentioned above. When the detected state satisfies a given condition, the charger is controlled to reduce the charging current. This prevents the maximum electric power consumed by the parallel monitors from becoming excessively large. For instance, the charging voltage from the charger, or the terminal voltage of the capacitor bank, is measured. When the measured voltage exceeds the set value, the charging current is gradually decreased. In a modified embodiment, the parallel monitors are judged whether they are ON or OFF, and if any one of them is ON, the charging current is reduced. In a still other embodiment, voltage comparators are connected in parallel with the parallel monitors, and the charging current is reduced according to the output signals from the voltage comparators.

The method of controllably charging capacitors in accordance with the present invention, the features and the operation are described in further detail below. As described previously, as the charging current increases, the rating of the parallel monitors needs to be increased. Temperature rise of the heat-dissipating devices of the parallel monitors caused by transient heat generation may be restricted to within a tolerable range if the duration is short. However, the rated maximum current and electric power of the electronic circuit must accommodate themselves to the elevated temperatures. In the ECS, charging is normally done in a time shorter than 15 minutes, e.g., 30 seconds, with a large electrical current. In this case, the rated power of the parallel monitors is inevitably set to an exorbitantly large value.

During the operation described above, heat generated by the parallel monitors can be dissipated with a heat-dissipating structure that is not very large so that a normal charging operation performed for 15 minutes is sufficiently tolerated if the variations of electrostatic capacitance and leakage current between the capacitors are less than approximately 15%. However, if the capacitors differ extremely in these characteristics, or if the charging current is extremely large, the ability to dissipate heat must be enhanced. Furthermore, in applications where rapid charging is done constantly with a large current, the heat-dissipating capability must be increased.

To prevent the rating of the parallel monitors from increasing in this way, the present invention decreases the charging current from the charger immediately prior to a fully charged condition. This is described in further detail with reference to FIG. 4(a).

FIG. 4(a) shows some examples of charging current-charging voltage characteristics of the charger in accordance with the present invention. The characteristic curve ① of FIG. 4(a) is the current-voltage characteristic of the charger designed to produce a charging current that is kept constant from the beginning of charging until a fully charged state is reached. On the other hand, the characteristic curve ② of FIG. 4(a) is the current-voltage characteristic of the charger designed to produce a charging current that is varied in the manner described now. When the terminal voltage of the capacitor bank is low, the charging current is set high. As the terminal voltage increases, the charging current is lowered. During most of the charging period, the charging electric power is maintained substantially constant. The charging current is limited to within a tolerable range in an initial stage of charging to prevent the current from becoming excessive.

The characteristic curve ② of FIG. 4(a) needs a smaller tolerable electric power to be supplied to the parallel monitor than the characteristic curve ① of FIG. 4(a). The characteristic curve ③ of FIG. 4(a) uses the characteristic curve ② of FIG. 4(a) and is further characterized in that the charging current is reduced at a rapid rate from the set voltage $V_p$ toward a voltage $V_m$ produced in a fully charged state, the set voltage $V_p$ being somewhat smaller than the voltage $V_m$. The decreasing characteristic curve ③ of FIG. 4(a) of the charging current is indicated by a straight line. Instead, it can be any arbitrary curve. Furthermore, it may be varied in a stepwise fashion as indicated by curve ④ of FIG. 4(a), in which case setting the set voltage $V_p$ to a lower value makes the apparatus more insensitive to variations of electrostatic capacitance and leakage current between the capacitors. However, in the region where the terminal voltage of the capacitor bank is above the set voltage $V_p$, the charging rate is reduced by an amount corresponding to the decrease in the current.

Figure 4B:
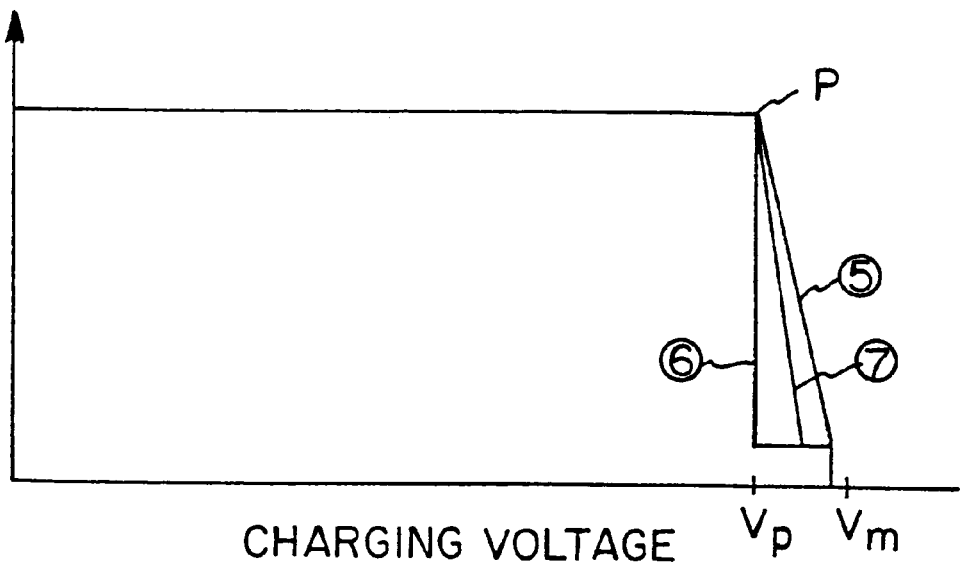

FIG. 4(b) shows other examples of charging current-charging voltage characteristics of the charger in accordance with the present invention. In each characteristic curve shown in FIG. 4(b), a charging current is kept constant from the beginning of charging until the charging voltage reaches to the set voltage $V_p$. According to the characteristic curve ⑤, the charging current gradually decreases after the charging voltage reaches to the set voltage $V_p$. According to the characteristic curve ⑥, the charging current decreases in a stepwise fashion after the charging voltage reaches to the set voltage $V_p$. According to the characteristic curve ⑦, after the charging voltage reaches to the set voltage $V_p$, the charging current gradually decreases and remains at the lower constant value.

The above-described characteristic curves ⑤–⑦ shown in FIG. 4(b) can be obtained by using the circuits shown in FIG. 3(b) or 3(c) or the combination thereof. On the other hand, the above-described characteristic curves ③–⑦ shown in FIGS. 4(a) and 4(b) can be obtained without using the circuits shown in FIGS. 3(a)–3(c). For example, it is possible to use a computer controlled charger which can control the charging current according to any one of the characteristic curves ③–⑦ as the charging voltage increases with a progress of charging.

In the present invention described thus far, the charging current is reduced greatly before a fully charged state occurs. Therefore, the permissible electric power for the parallel monitors and the required heat-dissipating capacity can be reduced by a factor of approximately 2 to 20 compared with the constant-current charging curve ① of FIG. 4(a).

With the above-described method, the set voltage $V_p$ at which the charging current starts to be reduced has been previously set. This set voltage $V_p$ can be made as close as possible to the voltage $V_m$ as long as all the capacitors are very uniform in electrostatic capacitance. However, where the capacitors differ greatly in electrostatic capacitance, the set voltage must be brought closer to zero on the opposite side of the fully charged state.

Accordingly, if it is presumed that capacitors have some degree of quality, then the set voltage $V_p$ can be determined correspondingly. Strictly, the optimum set voltage $V_p$ varies according to the usage of the capacitors.

In the method described above, the terminal voltage of the capacitor bank is utilized. Where signals indicating that parallel monitors are turned ON are used, the setting can be automatically varied according to variations of electrostatic capacitance between the capacitors. As shown in FIG. 2, signals indicating whether the parallel monitors are ON or OFF are taken from all the parallel monitors and coupled to logical OR gates, for example. Thus, a decision is made as to whether any parallel monitor is ON. The charging current from the charger is reduced (e.g., to 1/10 of the rating) according to a signal indicating the result. This method using the signals indicating that any parallel monitor is ON makes it necessary to take signals from the parallel monitors. This renders the configuration more complex than where the method using the aforementioned charging voltage is exploited. However, the best performance is obtained because the charging current is not reduced before any parallel monitor is actually turned ON.

In yet another embodiment of the invention, voltage comparators are connected in parallel with their respective parallel monitors (capacitors) to judge whether the terminal voltages have reached a given voltage. These judging signals from the comparators are coupled to logical OR gates, for example. Thus, a decision is made as to whether any one of the comparators is ON. The charging current from the charger may be reduced (e.g., to 1/10 of the rating) according to the resulting signal.

The decision signals from the comparators are compared with a standard value to sense whether the capacitors are at fault or their characteristics have deteriorated. Conversely, the point of the voltage $V_p$ may be found from the output signals from the voltage comparators which would normally be used for the above-described purpose and the charging current may be decreased.

Figure 5:
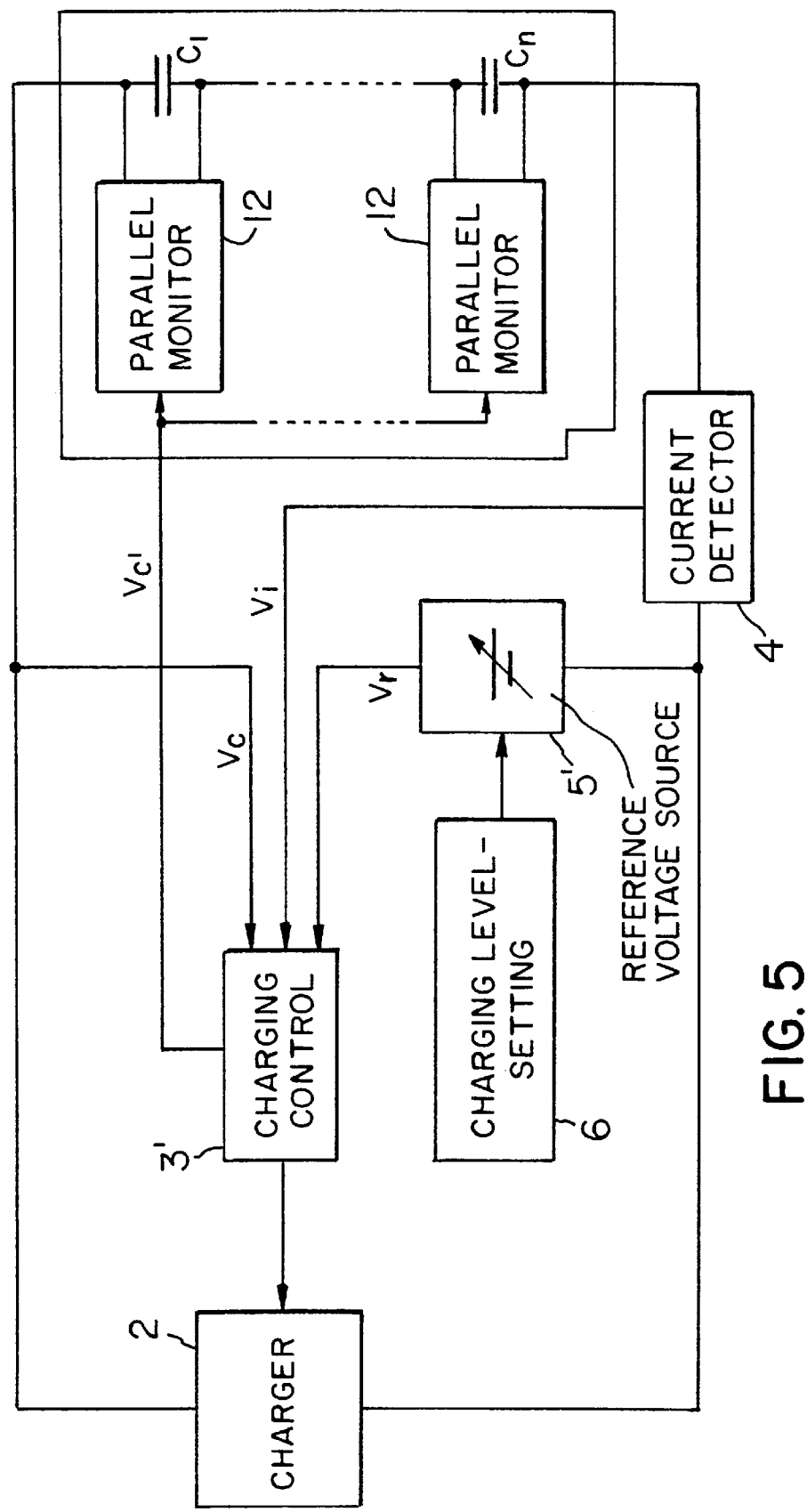
FIG. 5 is a circuit diagram of another charging control apparatus in accordance with the present invention.

FIG. 5 is a block diagram of another apparatus in accordance with the present invention. It is to be noted that like components are indicated by like reference numerals in FIG. 1. In FIG. 5, a charging level-setting portion 6 produces a signal specifying a charging level within a range of from 50 to 100%, assuming that the amount of electric power in a fully charged state is 100%. The user can set the charging level at will according to the application through the use of the setting portion 6. A reference voltage source 5' generates a reference voltage $V_r$ according to a charging level signal from the charging level-setting portion 6. The reference voltage is sent to a charging control circuit 3' which in turn controls the set voltage for the parallel monitors 12 according to the reference voltage $V_r$.

In this structure, we now discuss the case where the capacitor bank consists of ten capacitors having a maximum rated voltage of 3 volts and connected in series. The upper limit of the charging voltage from the charging control circuit 3' is set to 30 volts. The parallel monitors are so set that they begin to bypass the currents at a voltage sightly higher than 3 V (e.g., 3.05 V). Where the charging level is set to 100% by the charging level-setting portion 6, the reference voltage $V_r$ assumes its maximum value. Correspondingly, the charging control circuit 3' sets the maximum charging voltage to 30 V. The set voltage for the parallel monitors is set to a voltage slightly higher than 3 V (e.g., approximately 3.05 V) so that every capacitor is charged up to the maximum rated voltage. Therefore, where the charging level is set to 100%, charging is done in exactly the same was as in the embodiment of FIG. 1.

If the charging level is set to 50%, for example, by the charging level-setting portion 6, it is necessary that the charging of the capacitor bank be stopped or limited at approximately 70% of 30 V produced in a fully charged state. Accordingly, the reference voltage source 5' produces the reference voltage $V_r$ that is 70% of the maximum value according to a charging level signal indicating 50%. Correspondingly, the charging control circuit 3' sets the upper limit of the charging voltage to 21 V and sets the set voltage for the parallel monitors to 70% of the maximum rated voltage of 3 V (i.e., 2.1 V).

If charging is done at these settings, the parallel monitors start to operate and bypass the charging current when the terminal voltages of the capacitors reach 2.1 V. When all the parallel monitors operate, the terminal voltage $V_c$ of the capacitor bank reaches the upper limit of the charging voltage, i.e., 21 V. The charging control circuit 3' causes the charger 2 to stop the charging.

The circuits shown in FIGS. 3(a)–3(c) and combinations thereof can be used in the embodiment of FIG. 5 in exactly the same manner as in the embodiment of FIG. 1. However, the voltage $V_p$ needs to be varied at the same rate as the varying reference voltage $V_r$.

It is to be understood that the present invention is not limited to the above embodiments and that various changes and modifications are possible. For example, in the embodiments described above, decisions are made as to whether the parallel monitors are ON or not and as to whether the capacitors have been charged up to the given voltage V. Alternatively, the temperatures either of heat-dissipating boards to which the parallel monitors are mounted or of the bypass transistors in the parallel monitors may be detected and, if any detected temperature exceeds a preset value, the voltage is judged to have reached the voltage $V_p$ shown in FIGS. 4(a) and 4(b). Then, the charging current is reduced. In addition, in the above embodiments, the terminal voltage of the capacitor bank is directly detected. Instead, the output voltage from the charger may be detected.

As can be seen from the description provided thus far, in an apparatus in accordance with the present invention, the state of charge of a capacitor bank is detected. When certain conditions are met, the charging current is reduced. Therefore, parallel monitors used to charge capacitors rapidly with a large current can be designed with maximum ratings.

Having thus described my invention with the detail and particularity required by the Patent Laws, what is desired protected by Letters Patent is set forth in the following claims.

What is claimed is:

1. An apparatus for controllably charging a bank of capacitors connected in series with a charging current, said apparatus comprising:

a charger for charging said capacitor bank and for controlling a charging current;

parallel monitors connected in parallel with each capacitor, which detect terminal voltages developed across each capacitor and bypass said charging current at voltages in excess of a preset value;

a detection means for detecting a voltage developed across said capacitor bank; and a charging control means which compares the detected voltage of said capacitor bank with a reference value for reduction and controls said charger to reduce said charging current when the detected voltage of said capacitor bank reaches the reference value for reduction.

2. The apparatus of claim 1, further comprising a charging level-setting means for setting a charging level of said capacitor bank and a means for setting the preset value for said parallel monitors according to said set charging level.

3. An apparatus for controllably charging a bank of capacitors connected in series with a charging current, said apparatus comprising:

a charger for charging said capacitor bank and for controlling a charging current;

parallel monitors connected in parallel with each capacitor, which detect terminal voltages developed across each capacitor and bypass said charging current at voltages in excess of a preset value, said parallel monitors generating signals indicating whether the parallel monitors are ON or OFF;

a decision means for producing a decision signal in response to the signals from said parallel monitors when at least one of the parallel monitors is ON; and a charging control means which controls said charger to reduce said charging current in response to the decision signal.

4. The apparatus of claim 3, further comprising a charging level-setting means for setting a charging level of said capacitor bank and a means for setting said preset value for said parallel monitors according to said set charging level.

5. An apparatus for controllably charging a bank of capacitors connected in series with a charging current, said apparatus comprising:

a charger for charging said capacitor bank and for controlling a charging current;

parallel monitors connected in parallel with each capacitor, which detect terminal voltages developed across each capacitor and bypass said charging current at voltages in excess of a preset value;

a detection means for detecting a voltage developed across a capacitor of said capacitor bank; and a charging control means which compares the detected voltage with a reference value for reduction and controls said charger to reduce said charging current when the detected voltage reaches the reference value for reduction.

6. The apparatus of claim 5, further comprising a charging level-setting means for setting a charging level of said capacitor bank and a means for setting the preset value for said parallel monitors according to said set charging level.

* * * * *